June 14, 1966 — O. K. HUNSAKER — 3,256,007
TORQUE ROD SUSPENSION FOR TRUCK AXLES
Filed Oct. 2, 1962 — 2 Sheets-Sheet 1
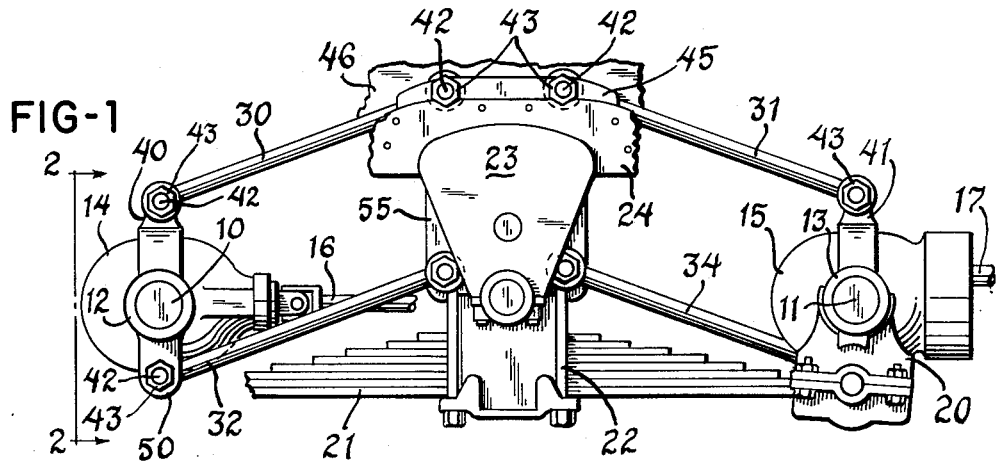
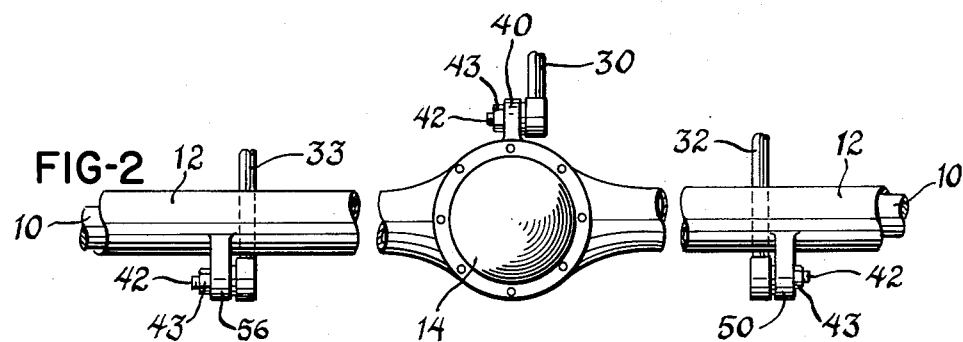
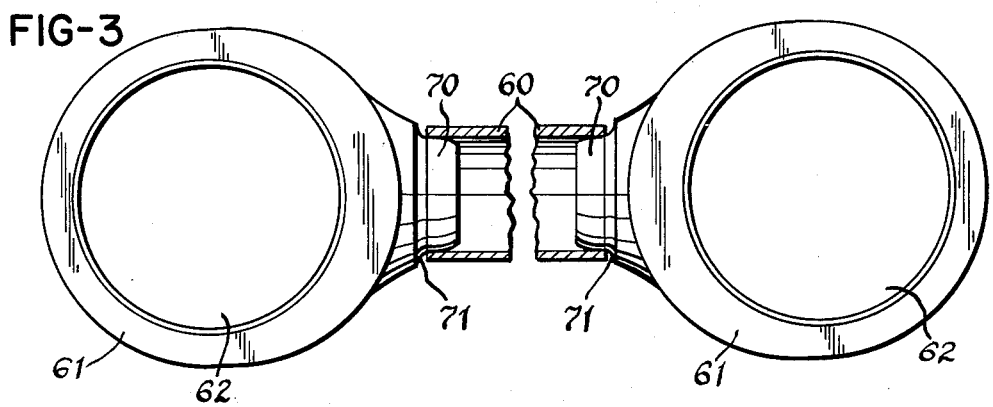
INVENTOR.
ORAL K. HUNSAKER
BY
Marechal, Biebel, French & Bugg
ATTORNEYS

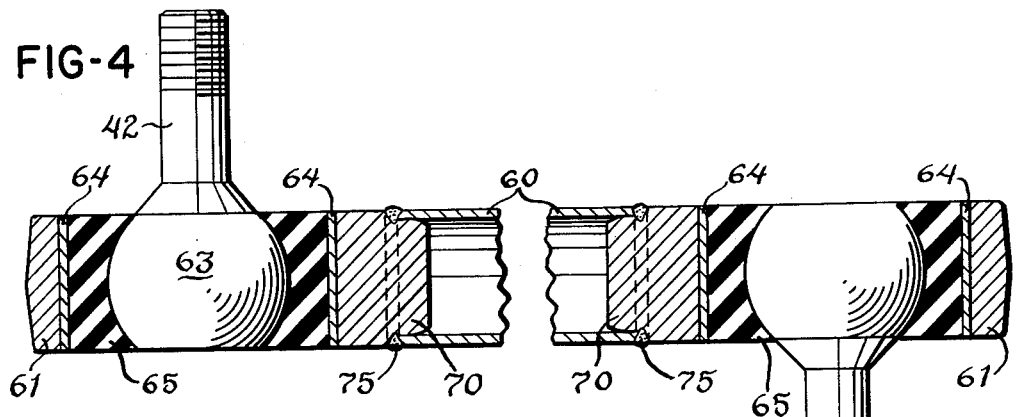
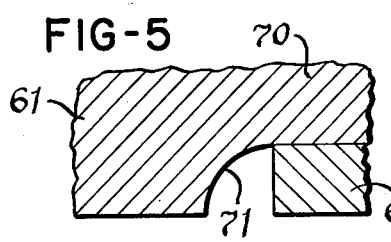
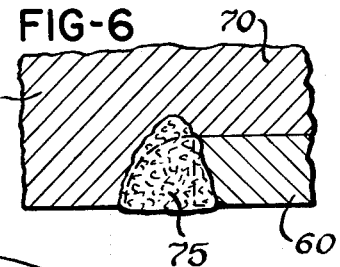
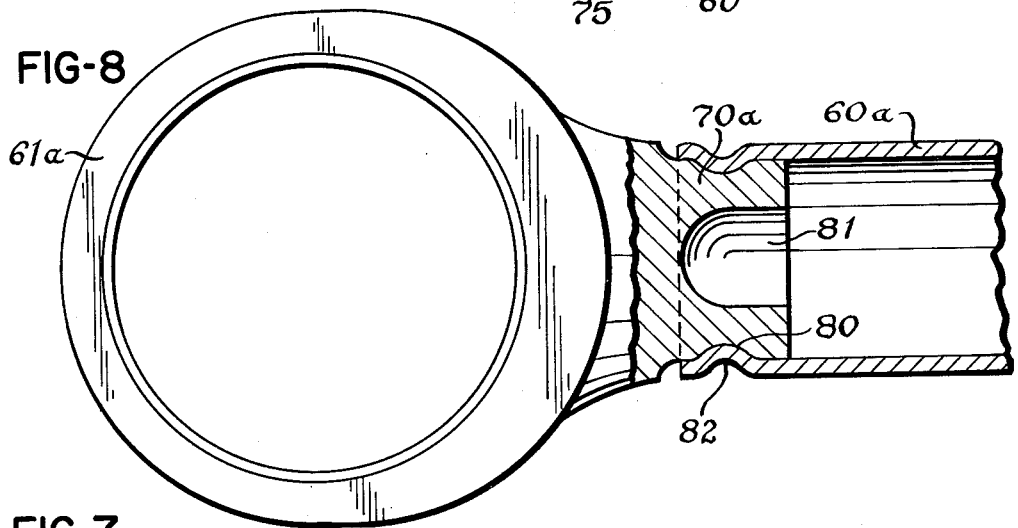
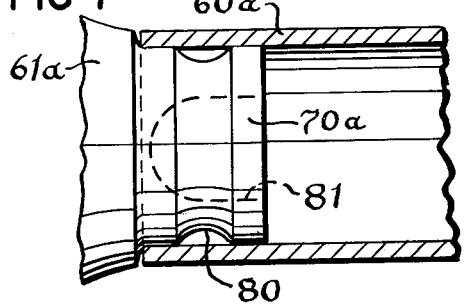

3,256,007
TORQUE ROD SUSPENSION FOR TRUCK AXLES
Oral K. Hunsaker, Dayton, Ohio, assignor to The Dayton Malleable Iron Company, Dayton, Ohio, a corporation of Ohio
Filed Oct. 2, 1962, Ser. No. 227,921
2 Claims. (Cl. 267—66)

This invention relates to torque rod suspensions for truck axles, especially tandem axle arrangements, and, more particularly, to fabricated torque rod structures including cast end fittings affixed to a tubular central rod portion.

As will be understood, torque rods are frequently used in the axle suspension of trucks, particularly tandem axle trucks, for interconnecting the axles or axle housings to the truck frame to control or maintain the desired positioning or alignment thereof as the axle moves vertically within the limits defined by the springs or suspension system. Conventionally, such torque rods are elongated members having sockets at each opposite end with threaded members or bolts embedded in a resilient or other material such as rubber for resiliently resisting or cushioning free movement of the rods with respect to the bolts by which the rods are mounted in the truck, with one end of the rod affixed to the frame and the other end affixed to the axle or axle housing.

Also as will be understood, although the end sockets and mounting structures may be fairly standard for such torque rods on various makes and sizes of trucks, a wide variety of different lengths is necessary to accommodate all trucks. Conventionally, malleable iron has been found to be an appropriate or desirable material for manufacturing such torque rods, with the entire rod, including both end sockets, cast in one piece as a malleable casting. The many variations in length, however, require that a manufacturer who wants to supply such torque rods for various types or sizes of trucks must maintain or provide perhaps a couple of dozen of different sizes of patterns, with the same variety of casting procedures and/or different inventories.

If, on the other hand, it is attempted to make a large number of identical end sockets or fittings and then weld or otherwise affix the fittings to different lengths of rod as may be required, other difficulties may be encountered. For example, the fact that any such torque rods (and, of course, any welded joints therein) may have to meet strength specifications of 18,000 or 20,000 lbs. may impose serious design difficulties on welding techniques (especially butt welds) which may not routinely be expected to withstand tensile or flexing forces on fatigue loading within that high range. Because of the known and well understood difficulty of obtaining sound welded joints between malleable iron and steel, furthermore, additional difficulties may be introduced unless the end sockets themselves are a material such as forged steel, rather than malleable or other castings.

Even in such situations and in view of the surface areas necessary for achieving the desired strength in a butt welded structure, the necessary diameter of the rod portion may be so great as to interject into the finished structure further disadvantages such as undesirably higher cost and unnecessarily increased dead weight, which, of course, is desired by neither the truck manufacturers nor the manufacturers of such torque rods. As will be apparent merely from the simplicity of the structure involved, the competitive marketing of such torque rods does not permit recourse to other more expensive types of joint structures involving threading or machining or other laborious operations.

According to this invention, by contrast, satisfactory torque rod structures are provided so that a large plurality of identical end socket components may be inexpensively produced as malleable castings from a single pattern and to maintain a single inventory, and then orders for a complete range of lengths of torque rods can be filled from that single inventory by utilizing steel tubular central members of any length desired and fabricated with two end castings into the desired torque rods. That is, casting structures and fabricating techniques in accordance herewith provide for developing suitably strong yet light fabricated torque rods with a combination interfitting and welded joint between the tubular member and the end castings which withstands satisfactorily high tensile strength forces, despite the known difficulties inherent in either attempting to weld steel to malleable iron or in butt welded joints of any sort in such truck torque rods. As a further feature of this invention, there is also provided a fabricated tubular-casting joint structure with which any welding may be eliminated, and in any case, the techniques and constructions in accordance herewith permit the economic production of any of a wide variety of lengths of such torque rods with a minimum of fabrication or assembling labor, substantially in the absence of machining operations on either end castings or the tubular midsection, and utilizing but a single inventory of identical component parts regardless of the particular lengths ultimately desired.

Thus, a large plurality of small volume orders each for a wide variety of different torque rod sizes is readily fulfilled from a single inventory of mass produced components without the necessity for either expensive and different foundry operations for each size or the maintenance of different inventories of different sizes, and yet the resulting structure produces satisfactory results as compared with unitary cast torque rods, while also achieving the desired performance requirements more economically and with less dead weight in the finished structure than previous techniques for producing fabricated torque rods.

With the foregoing and additional objects in mind, this invention will be more particularly described and other objects and advantages thereof will be apparent from the following description, the accompanying drawings, and the appended claims.

In the drawing:

FIG. 1 somewhat diagrammatically illustrates the inclusion of torque rods embodying and for practicing this invention in a suspension system for tandem rear axles of a tandem axle truck, as viewed from one side of the truck;

FIG. 2 is a similarly diagrammatic view with some parts broken away, as an end view of FIG. 1 taken from the position indicated by the line 2—2;

FIG. 3 is a view on a somewhat larger scale of one embodiment of a partially completed torque rod in accordance herewith and as assembled prior to welding, etc.;

FIG. 4 is an edge view of the torque rod of FIG. 3 after completion of the welding thereof and the insertion of threaded members for affixing the torque rod to the truck frame and axles;

FIGS. 5 and 6 are fragmentary detail showings on a somewhat larger scale indicating the weld area of the torque rod structure before and after welding in accordance herewith;

FIG. 7 is a fragmentary detailed view on a somewhat larger scale indicating an additional embodiment of a joint structure between end casting and tubular midsection in accordance herewith partially completed; and FIG. 8 illustrates the joint embodiment of FIG. 7 in completed form.

Referring to the drawings, in which like reference characters refer to like parts throughout the several views thereof, there is shown somewhat diagrammatically in FIG. 1 the rear tandem axles of a tandem axle automotive truck utilizing a torque rod suspension illustratively in accordance herewith. Thus, driven rear axles 10 and 11 are indicated as extending in axle housings 12 and 13, each of which has a central enlarged differential casing 14 and 15 for enclosing the conventional differential arrangement, with a portion of the drive or impeller shaft being indicated at 16 and 17, all in known manner. The axle housings 12 and 13 are supported adjacent the opposite ends thereof by a conventional arrangement of axle-spring supports 20 carried at the opposite ends of conventional leaf springs 21 (with the left-hand support being omitted from the drawing for clarity), which is in turn supported as by U-bolts 22 from spring hanger bracket 23 carried by a portion of the main chassis or frame of the truck indicated at 24, once again, all in known manner.

In the particular arrangement indicated, which is to be understood as merely generally illustrative of truck axle suspensions, there are utilized three torque rods embodying this invention for each of the two tandem axles 10 and 11. These torque rods are indicated in FIGS. 1 and 2 at 30 and 31, above each axle 10 and 11, and two additional rods below each axle 10 and 11 and indicated at 32–34, with the fourth rod not shown. As will be understood, the arrangements of torque rods 30–34 in the illustrative drawings are merely generally indicative of conventional practice, which may also include a variety of other arrangements of torque rods. Thus, as illustrated, rods 30 and 31 are connected at one end to brackets 40 and 41 at the lateral center of axles 10 and 11, in conventional and known manner as by threaded members 42 passing through brackets 40 and affixed therein as by nuts 43, while each opposite end of rods 30 and 31 is affixed, as by similar threaded members 42 and nuts 43, to a holding bracket 45 rigidly mounted on a portion of the main truck chassis, indicated, for example, at 46.

In the illustrated arrangement, whereas there is but one torque rod 30 or 31 above each axle 10 and 11, there are provided two torque rods below each of the axles. Thus, one end of rod 32 is affixed to depending bracket 50 below axle housing 12 of axle 10 and spaced generally more to the extreme end thereof than bracket 40 for the affixing of torque rod 30. Torque rod 32 is connected to bracket 50 as by threaded member 42 and nut 43, as with all the other torque rods, and the opposite end of rod 32 is similarly affixed to a bracket 55 depending from and rigidly affixed to a portion of the main chassis of the truck, such as that indicated at 24 or 46. At the other end of the same axle housing, rod 33 is similarly affixed to a bracket 56 as by the threaded or bolt arrangement 42, 43, with the opposite end of rod 33 being similarly affixed to a bracket such as 55 on the opposite side of the truck chassis. As will be understood, a similar arrangement is provided for the other axle 11, which is omitted from FIG. 2 as being an essential duplicate thereof.

The particular structure of the various torque rods 30–34 (all of which, as will be understood, are essentially identical) is indicated in somewhat more detail in FIGS. 3–6. Thus, each of the torque rods 30–34 comprises a tubular midstcion 60 carrying at each opposite end thereof an end socket portion 61, which as indicated in FIGS. 3 and 4, is essentially a round casting having therein an enlarged opening 62. As indicated in more detail in FIG. 4, the completed structure includes threaded members 42, each of which includes a rounded base portion 63, and are inserted and affixed within the circular opening 62 as by being embedded in a mass of resilient or cushioning rubber or plastic material indicated at 65 and enclosed by a metal casing 64, all in known manner. As will be understood, other conventional and well-known fastening means (instead of threaded members 42) may also be used and are accommodated by the same end socket members 61.

At the juncture of tubular midsection 60 with end socket portions 61 (both of which are essentially identical for all the various torque rods and, indeed, for a variety of torque rods having different lengths as applied to different makes and types and sizes of trucks) there is a neck portion 70 having a diameter dimensioned for tight interfitting engagement within the internal circumference of tubular portion 60. Preferably, neck portion 70 on end sockets 61 also includes an annular chamfered surface 71 for receiving a weld as hereinafter described. Thus, with end fitting portions 61 being castings in accordance herewith, the diameter of neck portion 70 is machined to provide a tight fit with the internal circumferential surface of tubular member 60, while yet leaving a small annular groove at chamfered surfaces 71 (see, particularly, FIG. 5) when neck 70 is fitted as far as may be for tight fitting into the end of tubular member 60. To this end, neck portion 70 may be slightly bevelled axially as shown.

Into the groove between chamfered surfaces 71 and the end of tubular member 60 is instituted an annular weld 75 (as indicated more particularly in FIG. 6) for integrally joining the end tubular member 60 with chamfered surface 71 around neck portion 70 of end socket casting 61. Preferably, as indicated in FIG. 6, it is desired that annular weld 75 be formed in a way which actually penetrates both the surface of end casting or socket member 61 and tubular member 60, as providing a further or stronger unification of these two members in addition to the press fit of neck 71 into tubular member 60.

In this manner, a fabricated torque rod is produced in accordance herewith is of the order of 20%–30% lighter than a unitary cast or solid torque rod arrangements, yet such a torque rod can be produced readily of any length desired from a single inventory of end socket members 61 and lengths of tubing 60. Even as compared with fabricated steel rods having butt welded joints, a torque rod arrangement is provided herewith having less weight and/or at less expense, while yet meeting equal or greater tensile strength test specifications. Indeed, even when cast socket members 61 are formed as malleable iron castings (as preferred) and when tubular section 60 is steel tubing, still this particular arrangement produces a desirably rigid and strong weld 75, despite the well known difficulty of welding steel parts to malleable iron, and, it is believed, primarily because of the press fit arrangement of neck 70 into steel tubing 60 and the particular penetration and shape of the annular weld 75.

Although a variety of welding techniques are satisfactorily applicable, there may be noted as illustrative of a particularly satisfactory welding technique for use in accordance herewith (when the end socket casting 61 is malleable iron and when tubular member 60 is a relatively low carbon steel) a so-called micro wire weld utilizing inert gas shielding of the welding wire at fairly low amperage. One such process is that utilized or advocated in connection with Hobart Brothers Co., Troy, Ohio, welding wire "MIG 18," which is a low carbon steel welding wire approximately 0.035" in diameter, and utilizes a welding technique in which the welding wire is surrounded by a sheath of inert gas (such as carbon dioxide or argon or the like) so that atmospheric oxygen is excluded as much as practicable from the point of arcing or burning of the welding wire to avoid combination with the carbon in the weld area. For example, a wire feed rate of about 13 in. per minute and a blanket of inert gas surrounding the wire and fed at about 15 cu. ft. per hour provides satisfactory results.

It should also be noted that, as will be understood, the well known difficulties of welding malleable iron castings relate to the possible reconversion under welding heat of precipitated massive or spherulitic carbon in the matrix of the malleable iron, originally produced from carbides during annealing of the casting, to different forms of internal matrices which vitiate or interfere with the desired malleable casting characteristics. Thus, using a steel welding wire, atypical conditions are produced in the areas of the annealed malleable casting adjacent the point of burning the weld at temperatures where welding is to be effected as between malleable iron and the steel parts. Accordingly, it is particularly preferred herewith to use a fairly low carbon steel (i.e., approximately a 10–10 grade) for tubular member 60, which grade of steel provides sufficient structural strength for the torque rod in accordance herewith, while yet minimizing the carbon content in the steel and the temperature at which satisfactory welding can be achieved. Higher carbon steels, require a higher welding temperature for forming a satisfactory welded joint, with, of course, concomitant increases in the risk or danger of undesired reconversion of the malleable iron matrix at prolonged exposure to the welding temperature, even though a shielding atmosphere of inert gas may be provided around the welding wire, to minimize oxidation of whatever amounts of carbon may be present, in the casting, the steel being welded, or the welding wire itself to avoid or minimize conversion of the malleable iron structure to cementite adjacent the weld.

With the press fit insertion of neck portion 70 of end casting 61 into tubular member 60 and the provision of an annular weld 75 in accordance herewith, and particularly with the weld burned well into both casting 61 and steel tube 60 (illustrated in FIG. 6), satisfactory tensile strength results are achieved herewith in which the fabricated torque rod meets tensile strength specifications of the order of as high as 18,000–20,000 lbs., although such performances may well be substantially above those expected of the welding alone, even with steel parts. As a matter of fact, in a variety of significant test determinations of structures embodying and for practicing this invention utilizing malleable iron end castings 61 interfitted with and welded to low carbon steel tubular member 60 as described, failures in the completed torque rod have actually occurred at the interface between weld 75 and the steel tubular portion 60, most remarkably, instead of failures of the weld 75 with any portion of the malleable iron of end casting 61, and when the welding conditions were sufficiently controlled or at sufficiently low temperature to minimize reconversion of the desirable malleable iron structure to cementite or other undesired structures in the particular area of neck 70 immediately adjacent weld 75.

Another form of juncture between the tubular midsection and the end casting is indicated in FIG. 8, in which the end casting is indicated as 61a and the tubular midsection member as 60a. In connection with this embodiment, there is also provided a neck portion on casting 61a indicated as 70a, which neck portion includes an annular groove or depression 80 cast into the casting and a central opening 81, with the outer diameter of neck portion 70a machined to approximate as close as may be practicable the inner diameter of tubular member 60a for providing a press fit therebetween when initially assembled in the relationship indicated in FIG. 7. Thereafter, tubular portion 60a is given an annular deforming crimp 82 to retract and crimp tubular member 60a into annular groove 80, in known and well understood manner as for forming such crimps in tubing joints and the like.

During the formation of crimp 82 in tubular member 60a, however, a radially inward annular deforming pressure is provided of sufficient force so that the entire neck portion 70a will be radially inwardly deformed (because of the opening 81 therein) beyond the elastic return limit of steel tubing 60a, whereby, upon relaxation of crimping pressure, neck portion 70a will expand radially outwardly by an amount at least as great or greater than the elastic return of annular crimp 82 in tubular portion 60a to maintain an equalized radially outward tension force interlocking tubular portion 60a around and on neck portion 70a by virute of crimp 82 therein—even if no welding is provided between casting 61a and tubular portion 60a at the ends thereof.

As will be apparent from the foregoing, there is provided in accordance herewith a construction of fabricated torque rods for truck axle suspensions wherein the end socket castings can be provided from mass produced malleable iron, rigidly affixed to steel tubular members of any desired length, and by techniques where tensile strength specifications of the finished torque rod equal or exceed those demanded by the trucking industry, yet with the finished structure having substantially less weight than similar unitarily cast rods; and produced at substantially less expense for a variety of different lengths than either unitarily cast torque rods or fabricated and butt welded forged steel structures. Furthermore, such advantages are achieved while yet utilizing the desirable properties of malleable iron for the end casting sockets, and notwithstanding the known difficulty of achieving an adequately strong weld as between malleable iron and steel parts, by virtue of the particular configuration and arrangement of the interfitting constructions in accordance herewith.

While these particular structures and techniques form preferred embodiments of this invention, this invention is not limited to these particular structures and techniques and changes and modifications may be made therein without departing from the scope of this invention which is defined in the appended claims.

What is claimed is:

1. In a fabricated torque rod for suspension systems of truck axles and the like, the combination which comprises cast malleable iron end fittings at each opposite end of said torque rod for mounting said torque rod in use, an elongated hollow steel tubular member forming the central portion of said torque rod between said end fittings, each of said end fittings including a cylindrical neck portion inserted into an end of said tubular member and having a diameter providing firm interlocking engagement within said tubular member, an annular groove around said cylindrical neck portion on said end fittings and disposed thereon adjacent the end of said tubular member for receiving an annular welding bead integrally uniting said malleable iron cast end fitting with said steel tubular member, and a welding bead disposed substantially continuously around and into said annular groove and adjacent and into said end of said tubular member.

2. The method of producing fabricated torque rods having end fittings and elongated cylindrical central portions of various lengths for use in suspensions for truck axles and the like, which comprises the steps of selecting a pair of malleable iron fittings from a plurality of already cast identical end fittings for said torque rods, each of said end fittings including a connecting neck portion for engagement and fabrication with said central elongated cylindrical portions of different lengths and said end fittings being formed substantially entirely of malleable iron castings, selecting a hollow steel tubular section of desired length for said elongated central portion having an internal diameter large enough to provide a tight sliding fit over and around said neck portions on said end fittings, inserting said neck portions of a pair of said end fittings into each opposite end of said tubular member, and forming an annular welding bead around each of said neck portions of said end fittings at each end of said tubular member for uniting said cast end fittings rigidly and permanently with said tubular member, said welding step including burning said welding bead into both said cast end fitting and the end of said tubular member substantially entirely therearound.

References Cited by the Examiner

UNITED STATES PATENTS

| | | | |
|---|---|---|---|
| 617,484 | 1/1899 | Haskell | 74—579 |
| 1,280,878 | 10/1918 | Seymour | 74—579 |
| 1,428,024 | 9/1922 | Garman | 74—579 |
| 2,026,338 | 12/1935 | Zerk | 29—463 |
| 2,034,219 | 3/1936 | Williams | 29—441 |
| 2,105,132 | 1/1938 | Soehner et al. | 267—66 |
| 2,178,858 | 11/1939 | Hufferd. | |
| 2,203,291 | 6/1940 | Best | 267—66 |
| 2,750,200 | 6/1956 | Scheel | 267—67 X |
| 2,755,097 | 7/1956 | Elconin | 267—67 X |
| 2,784,980 | 3/1957 | Norrie | 267—67 X |
| 2,880,991 | 4/1959 | Ward | 267—67 |
| 3,015,238 | 1/1962 | Williams | 29—463 |

FOREIGN PATENTS 24,461     1908    Great Britain.

BROUGHTON G. DURHAM, *Primary Examiner.*

CAROLYN F. GREEN, *Assistant Examiner.*